United States Patent [19]

Okada

[11] Patent Number: 4,905,523
[45] Date of Patent: Mar. 6, 1990

[54] FORCE DETECTOR AND MOMENT DETECTOR USING RESISTANCE ELEMENT

[75] Inventor: Kazuhiro Okada, Ageo, Japan

[73] Assignee: Wacoh Corporation, Ageo, Japan

[21] Appl. No.: 295,601

[22] PCT Filed: Apr. 22, 1988

[86] PCT No.: PCT/JP88/00394
§ 371 Date: Dec. 19, 1988
§ 102(e) Date: Dec. 19, 1988

[87] PCT Pub. No.: WO88/08521
PCT Pub. Date: Nov. 3, 1988

[30] Foreign Application Priority Data

Apr. 24, 1987 [JP] Japan ............... 62-101268
Apr. 24, 1987 [JP] Japan ............... 62-101272

[51] Int. Cl.⁴ ............. G01L 5/16; G01L 1/22
[52] U.S. Cl. ................. 73/862.04; 73/862.67
[58] Field of Search .......... 73/862.04, 862.05, 862.06, 73/862.67

[56] References Cited

U.S. PATENT DOCUMENTS 4,573,362 3/1986 Amlani ................. 73/862.04
4,762,006 8/1988 Asakawa et al. .......... 73/862.04

FOREIGN PATENT DOCUMENTS 61-223626 10/1986 Japan .

Primary Examiner—Charles A. Ruehl
Attorney, Agent, or Firm—Ladas & Parry

[57] ABSTRACT

Force and moment exerted on the working point (P) on a semiconductor substrate (110; 210), on one surface of which resistance elements (r, R) having an electric resistance varying due to mechanical deformation are formed, are detected. A portion spaced from the working point of the semiconductor substrate is fixed. Since openings (113) or bridge portions (212 to 215) are formed in the semiconductor substrate, when a force or an angular moment in a fixed direction is applied to the working point, uneven stresses are produced on the semiconductor substrate. Such uneven stresses are detected as changes in electric resistances of the resistance elements. A measure is taken for an arrangement of resistance elements on the semiconductor substrate, thereby to constitute predetermined bridges. Thus, forces in three directions and angular moments in three directions in the three-dimensional space can be independently read as bridge voltages, respectively.

4 Claims, 12 Drawing Sheets

|   | R1 R2 R3 R4 | R5 R6 R7 R8 | R9 R10 R11 R12 | R13 R14 R15 R16 |
|---|---|---|---|---|
| Fx | − + + − | + − − + | + + + + | − − − − |
| Fy | + + + + | − − − − | + − + + | − + + − |
| Fz | − + − + | + − + − | − + − + | + − + − |
| Mx | − + − + | − + − + | O O O O | O O O O |
| My | O O O O | O O O O | − + − + | − + − + |
| Mz | − + + − | − + + − | − + + − | − + + − |

FIG. 10

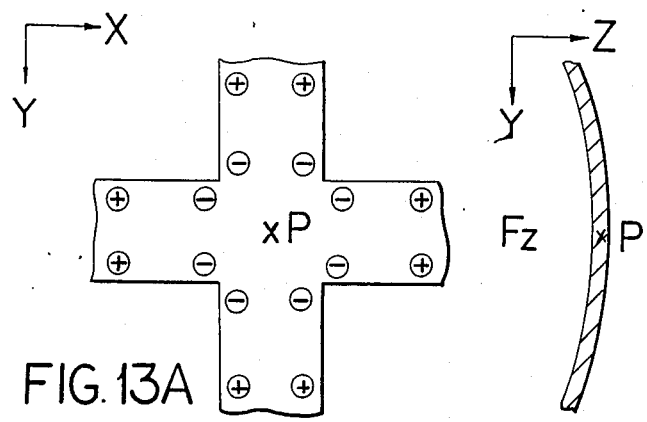
FIG. 13A
FIG. 13C
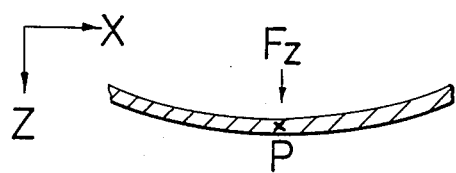
FIG. 13B
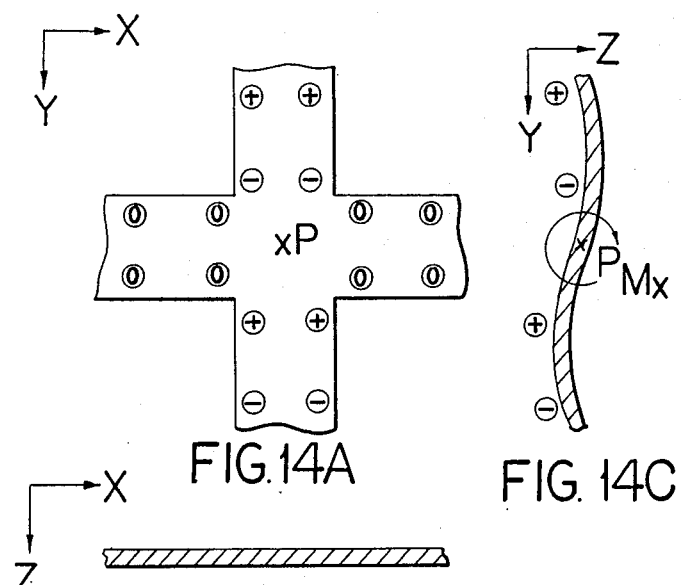
FIG. 14A
FIG. 14C
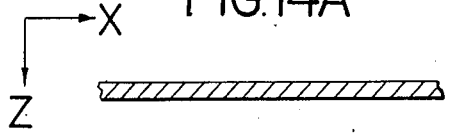
FIG. 14B

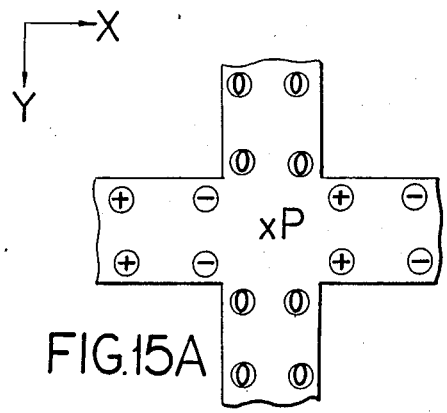
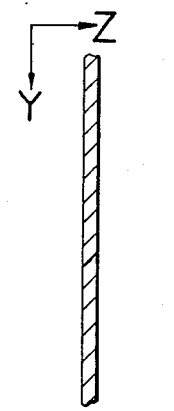
FIG. 15A  FIG. 15C
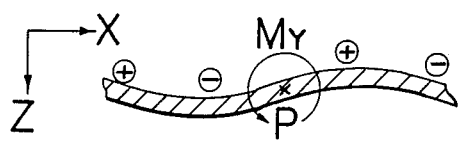
FIG. 15B
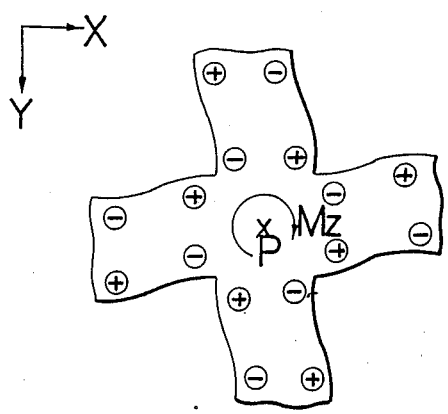
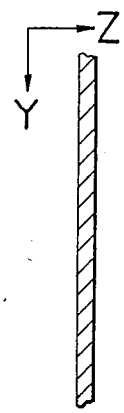
FIG. 16A  FIG. 16C
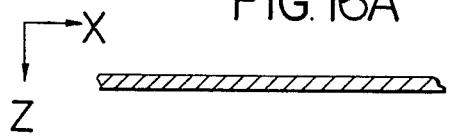
FIG. 16B

|    | VFx | VFy | VFz | VMx | VMy | VMz |
|----|-----|-----|-----|-----|-----|-----|
| Fx | V   | O   | O   | O   | O   | O   |
| Fy | O   | V   | O   | O   | O   | O   |
| Fz | O   | O   | V   | O   | O   | O   |
| Mx | O   | O   | O   | V   | O   | O   |
| My | O   | O   | O   | O   | V   | O   |
| Mz | O   | O   | O   | O   | O   | V   |

FORCE DETECTOR AND MOMENT DETECTOR USING RESISTANCE ELEMENT

FIELD OF THE INVENTION

This invention relates to a force detector and a moment detector using resistance element, and more particularly to a detector to detect force and moment as stress-strain to convert the stress-strain to a change in resistance value of resistance element, thus to provide an output in the form of an electric signal.

BACKGROUND ART

Generally, a device for detecting force or moment applied on a working point detects stress-strain produced by the application of the force or moment, thereby to indirectly detect force or moment. Detection of stress-strain is made by providing sensors such as strain gauges on respective portions of a strain generative body and producing a stress-strain in response to the application of force or moment to measure changes in, e.g., resistance values, etc. of those sensors. For instance, where a strain gauge is used as the sensor, stress-strain appears in the form of resistance changes of the strain gauge.

However, the problems with conventional force detector and moment detector are as follows:

First problem is that the device becomes complicated in structure and becomes large-sized. Namely, since a stress sensor such as a strain gauge must be stuck onto a body which is an object in which a stress-strain is caused (hereinafter such a body is referred to as a strain generative body), it is difficult to allow the device to be small-sized. Particularly, in the case of detecting forces and moments in regard to respective directions of three dimensions, it is required to construct a strain generative body in three dimensions to arrange a plurality of strain gauges in three dimensions, so that the structure of the device becomes extremely complicated.

Second problem is that such a conventional device is not suitable for mass production and becomes costly. It is very difficult to conduct the above-mentioned work for sticking strain gauges onto a strain generative body of complicated structure in accordance with a manufacturing line having good efficiency.

Third problem is that measurement accuracy is low. This is because there is a limit in the accuracy of a conventional stress sensor such as a strain gauge, thus failing to make a high precision measurement.

Fourth problem is that complicated computation is required for detecting a force or moment in a specified direction. For example, in the case of arranging strain gauges in three dimensions to independently detect six quantities of forces exerted or applied in respective axial directions and moments exerted or applied about respective axes on the basis of respective outputs thereof, respectively, a complicated computation is required. Since strain gauges respond to given six quantities, respectively, it is required for measuring a specific quantity to perform such a computation to cancel other five quantities.

DISCLOSURE OF THE INVENTION

A first object of this invention is to provide a force detector and a moment detector which are simple in structure and can be small-sized.

A second object of this invention is to provide a force detector and a moment detector which are suitable for mass producibility and can be reduced in the manufacturing cost.

A third object of this invention is to provide a force detector and a moment detector which are capable of making a high accuracy measurement.

A fourth object of this invention is to provide a force detector and a moment detector which are capable of obtaining desired measured values with a simple computation.

This invention has attained the above-described objects by the following features.

The first feature of this invention resides in that there are provided, in a moment detector, a semiconductor substrate provided on one surface thereof with resistance elements having an electric resistance varying due to mechanical deformation, a working body for applying an angular moment to a working point provided at a point on the semiconductor substrate, and a supporting body for fixedly supporting a portion spaced from the working point of the semiconductor substrate, wherein an opening produces an uneven stress in the semiconductor substrate when an angular moment is applied to the working point is formed in the semiconductor substrate, thus to detect the uneven stress as changes in the electric resistances of the resistance elements.

In accordance with the above-described moment detector, angular moment is applied to the working point of the semiconductor substrate through the working body. Since a portion of the semiconductor substrate is fixedly supported by the supporting body, a stress is applied to the semiconductor substrate by the applied angular moment. In addition, since an opening is formed in the semiconductor substrate, this stress becomes uneven on the substrate. Accordingly, the resistances of resistance elements formed on the substrate vary in dependence upon the direction and the magnitude of the applied angular moment. Thus, moment can be detected as an electric signal.

Since resistance elements are all formed on one surface of the semiconductor substrate, the structure becomes very simple. Thus, the detector can be small-sized and becomes suitable for mass production. In addition, since such a resistance element has a sensitivity larger than that of strain gauge, measurement accuracy is improved.

In a device for detecting forces exerted in respective axial directions and moments exerted around respective axes with an origin being as a working point in an XYZ three-dimensional coordinate system, the second feature of this invention resides in provision of:

first bridging portions formed along the X-axis on respective both sides of the origin; and second bridging portions formed along the Y-axis on respective both sides of the origin, wherein both the ends of the first and second bridging portions are fixed as fixed portions so that strains are produced in respective bridging portions by applying a force to the origin, respectively, and wherein resistance element groups comprising a plurality of resistance elements having a property such that electric resistance changes due to mechanical deformation are provided on the XY plane of the first and second bridging portions at principal positions of the following positions:

a pair of positions for resistance elements arranged on both sides of the X-axis in respective positive and negative directions of the Y-axis in the vicinity of the origin in the positive direction of the X-axis, a pair of positions for resistance elements arranged on both sides of the X-axis in respective positive and negative directions of the Y-axis in the vicinity of the origin in the negative direction of the X-axis, a pair of positions for resistance elements arranged on both sides of the X-axis in respective positive and negative directions of the X-axis in the vicinity of the fixed portion in the positive direction of the X-axis, a pair of positions for resistance elements arranged on both sides of the X-axis in respective positive and negative directions of the Y-axis in the vicinity of the fixed portion in the negative direction of the X-axis, a pair of positions for resistance elements arranged on both sides of the Y-axis in respective positive and negative directions of the X-axis in the vicinity of the origin in the positive direction of the Y-axis, a pair of position for resistance elements arranged on both side of the Y-axis in respective positive and negative directions of the X-axis in the vicinity of the origin in the negative direction of the Y-axis, a pair of positions for resistance elements arranged on both side of the Y-axis in respective positive and negative directions of the X-axis in the vicinity of the fixed portion in the positive direction of the Y-axis, and a pair of positions for resistance elements arranged on both side of the Y-axis in respective positive and negative directions of the X-axis in the vicinity of the fixed portion in the negative direction of the Y-axis, thus to detect changes in the forces acting on the origin on the basis of changes in electric resistances of respective resistance elements.

In accordance with the above-described detector, resistance elements serving as a sensor for stress-strain are all formed on the XY plane. Accordingly, the device body can be constructed in a planar shape without allowing it to be constructed in three dimensions as in the conventional device. Thus, the device can be realized as a simple configuration.

In addition, since resistance elements serving as a sensor have a property such that electric resistance varies due to mechanical deformation and respective two resistance elements are paired to arrange them at specified positions, forces in respective axial directions and moments around respective axes can be independently detected by a simple computation.

BRIEF DESCRIPTION OF THE DRAWINGS

FIG. 10 is a Table showing resistance changes of respective resistance elements of the detector shown in FIG. 7;

FIGS. 13 (a)-13 (c) are views showing the state where a force in a Z-axis direction is exerted on the device shown in FIG. 7;

FIGS. 14 (a)-14 (c) views showing the state where a moment around the X-axis is exerted on the device shown in FIG. 7;

FIGS. 15 (a)-15(c) are views showing the state where a moment around the Y-axis is exerted on the device shown in FIG. 7;

FIGS. 16 (a)-16 (c) are views showing the state where a moment around the Z-axis is exerted on the device shown in FIG. 7.

BEST MODE FOR CARRYING OUT THE INVENTION

Figure 1:
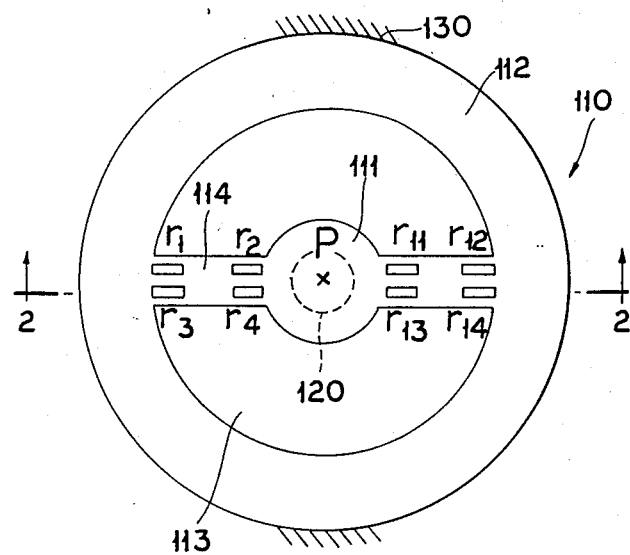
FIGS. 1 and 2 are a top view and a side cross sectional view of a moment detector according to an embodiment of this invention, respectively.
Figure 2:
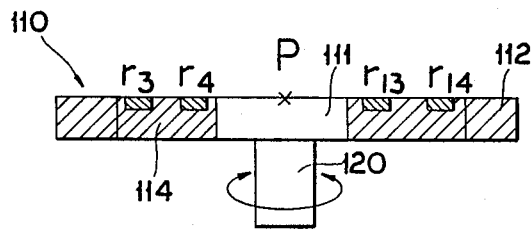

§1 Most preferred embodiment of the moment detector
  1.1 Basic configuration of the device FIG. 1 is a top view of a moment detector according to an embodiment of this invention, and FIG. 2 is a side cross sectional view cut along the cutting lines A—A of the above detector. This detector is provided with a silicon single crystal substrate 110, a working body 120 adhered to the central portion 111 of the substrate 110, and a supporting body 130 for fixedly supporting the peripheral portion 112 of the substrate 110 at a measurement place. Moreover, two openings 113 are provided in the substrate 110. By providing these openings 113, two bridging portions 114 are formed between the central portion 111 and the peripheral portion 112. On the surfaces of these bridging portions 114, resistance elements r1 to r4 and resistance elements r11 to r14 are formed, respectively. Such resistance elements r have a piezo resistance effect such that electric resistance changes due to mechanical deformation, and their structure and the forming method thereof will be described later in detail.

Figure 3:
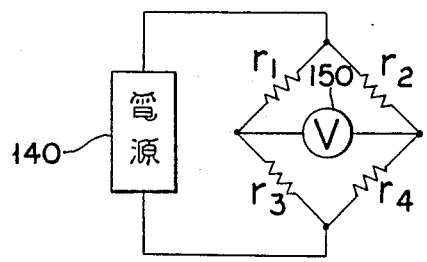
FIG. 3 is a circuit diagram showing the bridge construction of resistance elements in the device shown in FIG. 1.

Wiring as shown in FIG. 3 is implemented to respective resistance elements. Namely, a bridge circuit is constructed with resistance elements r1 to r4. A voltage is delivered from a power source 140 to the bridge circuit. The bridge voltage is measured by a voltage meter 150. Although not shown in FIG. 3, also for resistance elements r11 to r14, a bridge circuit is constructed in a manner similar to the above.

1.2 Operation of the detector

Figure 4:
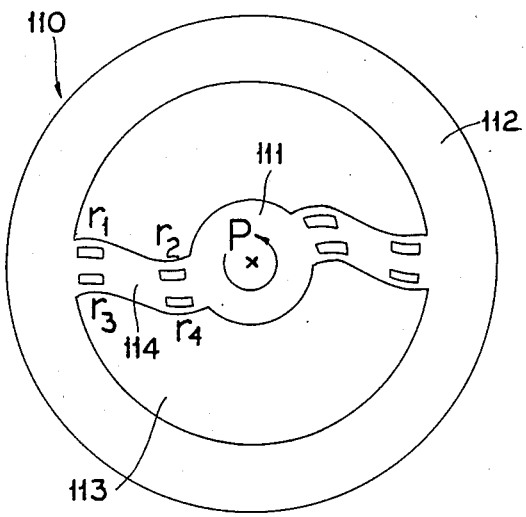
FIGS. 4 and 5 are views showing the operational principle of the device shown in FIG. 1.
Figure 5:
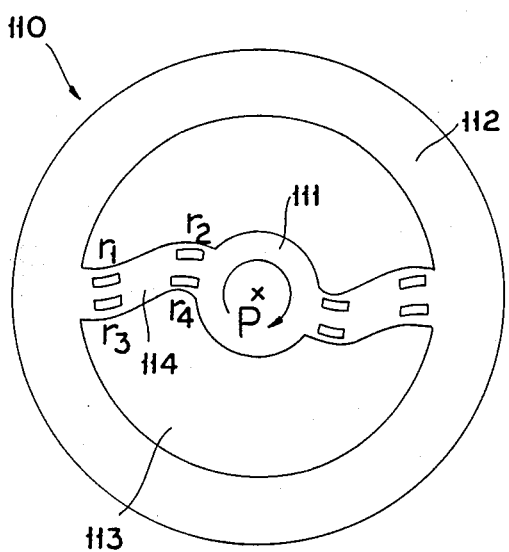

The operation of this detector will be now described with reference to FIGS. 4 and 5. FIGS. 4 and 5 are views showing stress-strains produced where rotations are applied to the single crystal substrate 110 counter-clockwise when viewed from the upper direction and clockwise when viewed in the same manner, respectively. Around the central points P, angular moments are produced in direction indicated by arrows, respectively. Since the peripheral portion 112 is fixedly supported to the outside, strains will be produced in the bridging bodies 114. However, since openings 113 are produced in the substrate 110, such strains do not become uniform within the substrate, so that strains applied will vary in dependence upon respective resistance elements r. For example, where a strain as shown in FIG. 4 is produced, when the conductivity of each resistance element is assumed to be of P-type, each electric resistance of the resistance elements r1 and r4 will increase because a force is applied to them in a direction such that they expand, and each electric resistance of the resistance elements r2 and r3 will decrease because a force is applied to them in a direction such that they contract. In contrast, where strains as shown in FIG. 5 are produced, a phenomenon opposite to the above takes place.

When it is now assumed that resistance elements r1 and r4 are called a first pair of resistance elements and resistance elements r2 and r3 are called a second pair of resistance elements, resistance elements r belonging to the same resistance element pairs will make similar changes with respect to an angular moment in a predetermined direction. When an attention is now drawn to the bridge circuit shown in FIG. 3, resistance elements r constituting the same resistance element pairs are positioned at opposite sides, respectively. Accordingly, for an angular moment as shown in FIG. 4, the first pair of resistance elements indicate an increase in resistance, and the second pair of resistance elements indicate a decrease in resistance. In contrast, for an angular moment as shown in FIG. 5, the first pair of resistance elements indicate a decrease in resistance, and the second pair of resistance elements indicate an increase in resistance. Eventually, the polarity of a bridge voltage appearing on the voltage meter 150 will correspond to the direction of an angular moment around the central point P, and the magnitude of that bridge voltage will correspond to the magnitude of that angular moment. In this way, the direction and the magnitude of an angular moment applied to the working body 120 can be detected by the voltage meter 150.

One merit of the detector according to this embodiment resides in the ability to compensate the influence of resistance changes based on parameters except for stress. The electric resistances of resistance elements r vary also in dependence upon, e.g., temperature, etc. However, as shown in FIG. 1, resistance elements r1 and r3 are provided at symmetrical positions and resistance elements r2 and r4 are provided at symmetrical positions, respectively, and thus resistance changes based on parameters except for stress of resistance elements provided at symmetrical positions become equal to each other. Accordingly, resistance changes based on parameters except for stress are cancelled each other, so that such changes do not appear on the output of the voltage meter 150.

Although only the detection by resistance elements r1 to r4 has been described, equivalent results detected may be similarly obtained even with resistance elements r11 to r14. By averaging both the results detected, measurement accuracy can be further improved. Alternatively, by selecting a suitable combination of resistance elements from resistance elements r1 to r4 and r11 to r14, similarly measured results may be obtained.

1.3 Embodiment suitable for realization of products

Figure 6A:
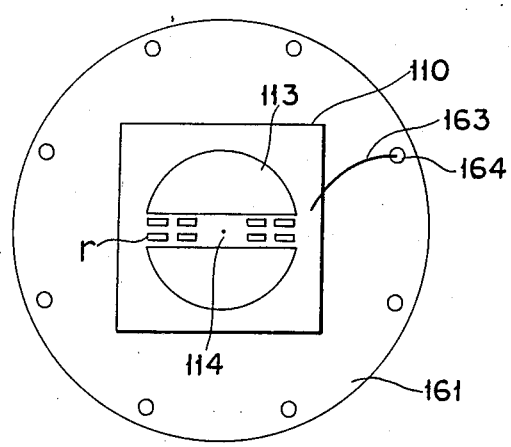
FIGS. 6 (a) and 6 (b) are views showing a moment detector according to another embodiment of this invention.
Figure 6B:
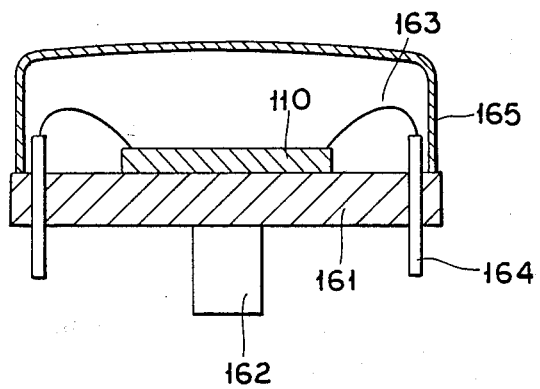

The most fundamental embodiment has been described as above. Aside from this, because a semiconductor substrate is generally brittle, it is preferable for actual realization of products to use a rigid body as the working body. FIGS. 6 (a) and 6 (b) are views showing such an embodiment wherein FIG. 6(a) is a top view and FIG. 6(b) is a side cross sectional view. In a manner similar to the above-described embodiment, openings 113 are formed in the single crystal substrate 110. Thus, a bridging portion 114 is formed. On the bridging portion 114, resistance elements r are formed. The single crystal substrate 110 itself is adhered to a rigid flat plate portion 161 comprised of e.g., metal material and a working portion 162 connected thereto. Respective resistance elements r are connected to wiring terminals 164 through bonding wires 163. In this case, it is preferable to provide a protective cover 165 over the device.

By forming the working portion 162 as a rigid body as stated above, an angular moment to be measured will be transmitted to the semiconductor substrate 110 through the rigid body 161, resulting in an improved durability.

1.4 Advantages with this device

Thus, since the above-described device uses resistance elements formed planar on the single crystal substrate, its structure becomes very simple. Moreover, since manufacturing can be conducted by ordinary semiconductor manufacturing processes, the device is suitable for mass production, can be reduced in cost, and can be small-sized. In addition, since resistance elements are comprised of a single crystal and therefore high accuracy resistance changes due to stress can be obtained, high precision measurement can be carried out.

§2 Most preferred embodiment of the three-dimensional detector

2.1 Fundamental configuration of the detector

Figure 7:
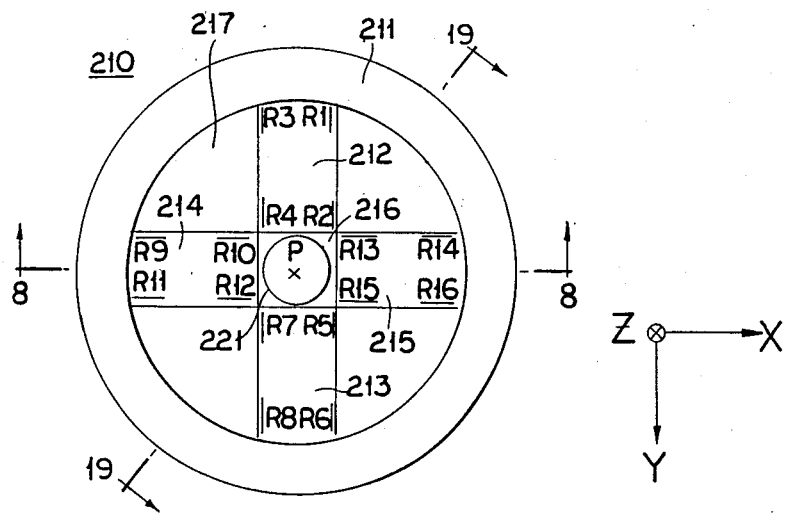
FIG. 7 is a top view of a detector according to an embodiment of this invention.
Figure 8:
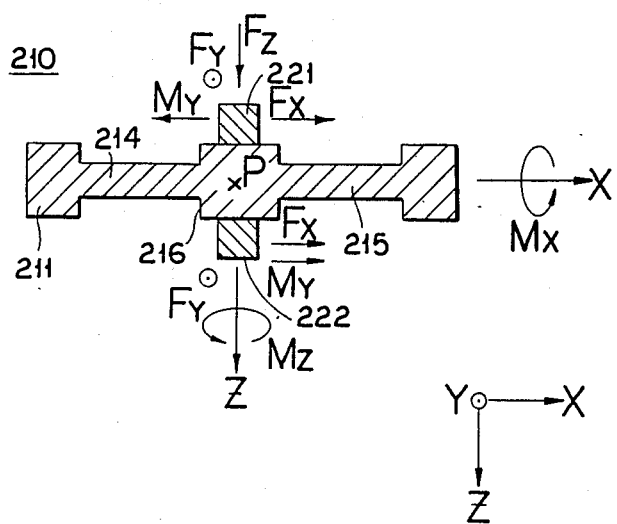
FIG. 8 is a cross sectional view cut along the cutting lines A—A of the detector shown in FIG. 7.

FIG. 7 is a top view of a detector according to an embodiment of this invention, and FIG. 8 is a cross sectional view cut along the cutting lines A—A of the detector shown in FIG. 7. In this embodiment, 16 sets of resistance element groups R1 to R16 are formed on the surface of a strain generative body 210. The strain generative body 210 is comprised of a silicon single crystal substrate. The resistance element groups R1 to R16 are sets of a plurality of resistance elements, respectively. Respective resistance elements are formed by diffusing impurities on the single crystal substrate. Resistance elements thus formed indicate piezo resistance effect and have a property such that electric resistance varies due to mechanical deformation.

The strain generative body 210 is composed of an annular fixed portion 211 formed along the periphery thereof, four bridging portions 212 to 215, and a working portion 216 to which the four bridging portions 212 to 215 are coupled. The fixed portion 211 is fixed to the outside and a force or moment to be detected is applied to the working point P positioned in the center of the working portion 216. Since the fixed portion 211 is fixed to the outside, when a force or a moment is applied to the working point P, strains based on stress corresponding to this force or moment are produced in the bridging portions 212 to 215. As a result, changes in electric resistance occur in the resistance element groups R1 to R16. This detector serves to detect force and moment on the basis of such changes of electric resistance. In this embodiment, respective resistance elements are the same in dimension, shape and material, and all have a resistance value equal to each other. In addition, resistance change rates based on the stress-strains are all equal to each other.

It is now assumed that, as shown in FIGS. 7 and 8, the working point P positioned in the center of the working portion 216 is set to the origin of the XYZ three-dimensional coordinate system, and three axes of X, Y and Z are defined as shown. Namely, it is assumed that the right direction of FIG. 7, the lower direction thereof, and the direction along the direction perpendicular to the plane of the paper are defined as X-, Y- and Z-axis positive directions, respectively. Working bodies 221 and 222 are affixed at upper and lower positions of the working portion 216. Thus, forces and moments exerted on the working point P will be all applied through the working bodies 221 and 222. Here, in regard to the working point P, forces applied in X-, Y- and Z-axis directions are assumed as FX, FY and FZ, respectively, and moments applied around the X-, Y- and Z-axes are assumed as MX, MY and MZ, respectively. On this assumption, forces and moments are defined in respective directions indicated by arrows in FIG. 8. Namely, the force FX applied in the X-axis direction serves as such a force to both move working bodies 221 and 222 in a right direction of the figure. The force FY applied in the Y-axis direction serves as such a force to both move working bodies 221 and 222 in an upper direction along the direction perpendicular to the plane of the paper of the figure. Moreover, the force FZ applied in the Z-axis direction serves as such a force to both move the working bodies 221 and 222 in a lower direction of the figure. Further, the moment MX around the X-axis serves as such a moment to move the working body 221 in an upper direction along the direction perpendicular to the plane of the paper and the working body 222 in a lower direction along the direction perpendicular to the plane of the paper. The moment MY around the Y-axis serves as such a moment to move the working body 221 in a left direction of the figure and the working body 222 in a right direction of the figure. Moreover, the moment MZ around the Z-axis serves as such a moment to both move the working bodies 221 and 222 clockwise when viewed from the upper direction of the device.

The above-mentioned 16 sets of resistance element groups R1 to R16 are arranged at symmetrical positions as shown in FIG. 7. Namely, resistance elements R1 to R4, R5 to R8, R9 to R12, and R13 to R16 are provided at the bridging portions 212, 213, 214 and 215, respectively. When attention is drawn to the respective bridging portions, pairs of resistance element groups are provided in the vicinity of the fixed portion 211 and the working portion 216, respectively, and respective pairs of resistance element groups are provided on both the sides of the X-axis or Y-axis between which they are put.

By using such 16 sets of resistance element groups, six kinds of bridges as shown in FIGS. 9(a) to (f) are formed. To these bridges, power sources 230 are connected, respectively, and voltage meters 241 to 246 to output voltages VFX, VFY, VFZ, VMX, VMY, and VMZ proportional to FX, FY, FZ, MX, MY, and MZ are connected, respectively.

It is to be noted that symbols of respective resistance elements shown in this bridge circuit diagram mean one resistance element in the resistance element group, and even if resistance elements are labeled the same symbols, those elements mean other resistance elements belonging to the same resistance element groups. For example, R1 is used in two bridges in FIGS. 9(b) and (d). In practice, two resistance elements are arranged at the position of R1 in FIG. 7 and different resistance elements are used in different bridges.

For convenience of explanation, also for expressing one resistance element belonging to the resistance element group Rx (x=1 to 16), the same symbol Rx will be used.

2.2 Operation of the device

The operation of the above-described device will be described. When forces or moments FX, FY, FZ, MX, MY, and MZ are applied to the working point P in the arrangement of resistance elements as shown in FIG. 7, respective resistance elements R1 to R16 produce electric resistance changes as indicated by the Table shown in FIG. 10 (respective resistance elements are assumed to be comprised of a P-type semiconductor), wherein "0", "+" and "−" indicate no change, an increase in electric resistance, and a decrease in electric resistance, respectively.

Figure 11A:
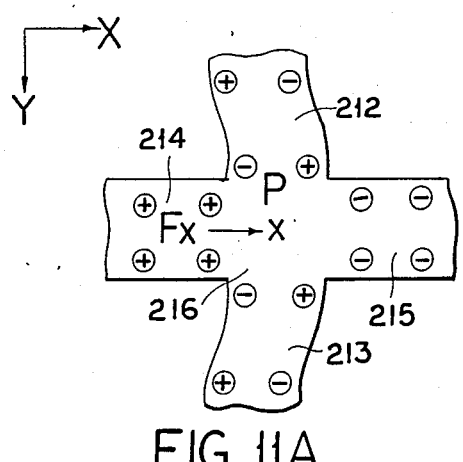
FIGS. 11 (a)-11(c) are views showing the state where a force in an X-axis direction is exerted on the device shown in FIG. 7.
Figure 11C:
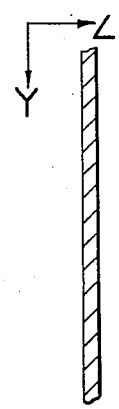
Figure 11B:
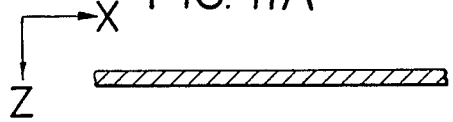
Figure 12A:
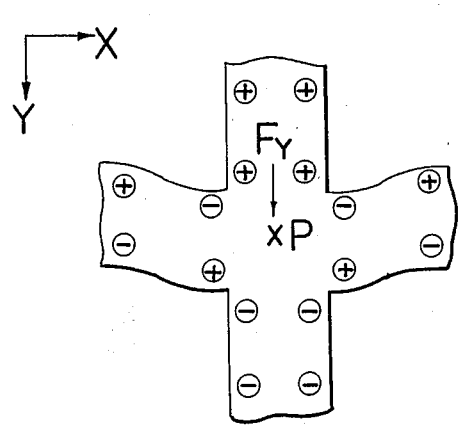
FIGS. 12 (a)-12 (c) are views showing the state where a force in a Y-axis direction is exerted on the device shown in FIG. 7.
Figure 12C:
Figure 12B:
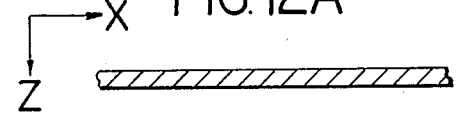

Here, the reason why results as shown in FIG. 10 are obtained will be briefly described with reference to FIGS. 11 to 16. FIGS. 11 to 16 are views showing stress-strains and changes in electric resistance produced in the bridging portions when forces or moments FX, FY, FZ, MX, MY, and MZ are applied to the working point P, respectively, wherein (a), (b) and (c) are a top view of the bridging portions, a front cross sectional view thereof, and a side cross sectional view thereof in these figures, respectively. For example, the state where the force FX in the X-axis direction is exerted on the working point P is shown in FIG. 11. By the force FX, the bridging portion 214 will expand and the bridging portion 215 will contract. Accordingly, resistance elements (R9 to R12) provided on the bridging portion 214 expand, resulting in an increased electric resistance (in the case of P-type semiconductor), while resistance elements (R13 to R16) provided on the bridging portion 215 contract, resulting in a decreased electric resistance. Resistance elements provided on the bridging portions 212 and 213 expand or contract in dependence upon the arrangement positions. Eventually, it will be readily understood that results as shown by the first row in the Table of FIG. 10 are obtained. It will be also understood that results shown by the second to sixth row in the Table of FIG. 10 are obtained.

Figures 17, 18:
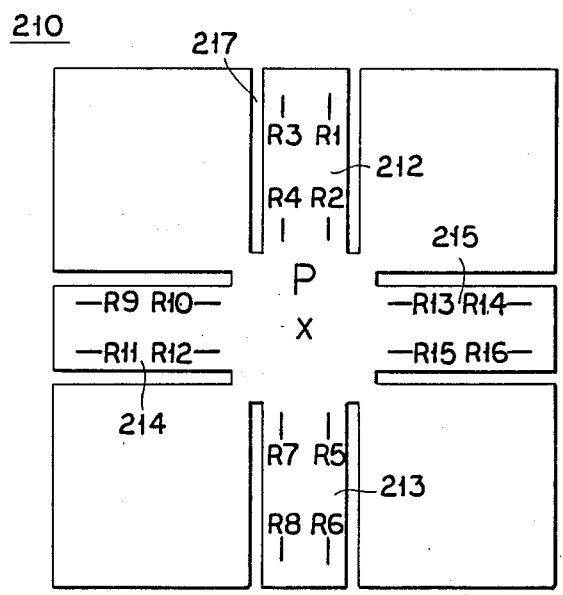
FIG. 17 is a Table showing the relationship between a force to be detected and a voltage detected in the device shown in FIG. 7.
FIG. 18 is a top view of a detector according to another embodiment of this invention.

Now, by taking into consideration the fact that bridges as shown in FIGS. 9's are constructed by respective resistance elements R1 to R16, the relationship between FX, FY, FZ, MX, MY, and MZ applied to the working point P and voltages detected VFX, VFY, VFZ, VMX, VMY and VMZ appearing on the voltage meters 241 to 246 is indicated by the Table shown in FIG. 17, wherein "0" indicates that no voltage change is produced and "V" indicates that a voltage change dependent upon an applied force or moment occurs. The polarity of the voltage change depends upon the direction of an applied force or moment, and the magnitude of the voltage change depends upon the magnitude of an applied force or moment.

Figures 9A, 9B:
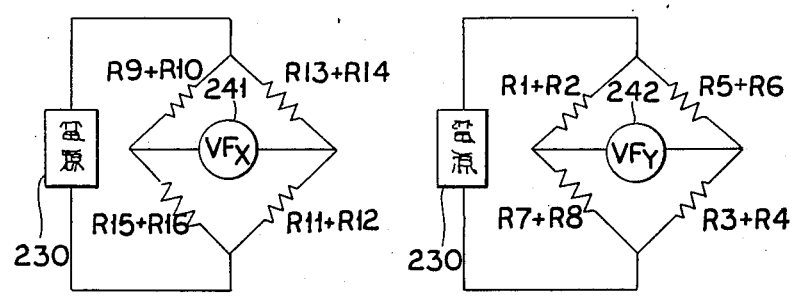
FIGS. 9 (a) 9 (f) are circuit diagrams of six bridges formed with respective resistance elements of the detector shown in FIG. 7.
Figures 9C, 9D:
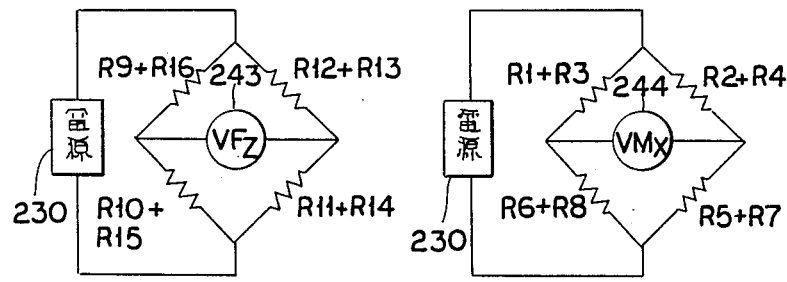
Figures 9E, 9F:
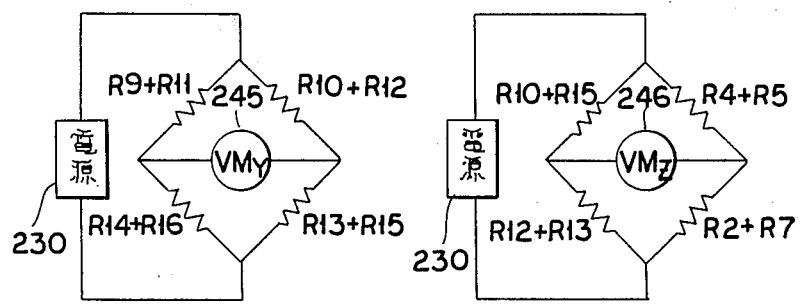

It will be readily understood that Table as shown in FIG. 17 is obtained when attention is drawn to the fact that there is no voltage change in the case where products of resistance values of resistance elements provided at respective opposite sides of the bridge are equal to each other in the circuit diagram of FIG. 9. For instance, when force FX is applied, respective resistance elements produce changes in electric resistance as indicated by the first row in the Table of FIG. 10. Referring now to FIG. 9(a), resistance values of R9, R10, R11 and R12 are all increased and resistance values of R13, R14, R15 and R16 are all decreased. Accordingly, there is a great difference between products of resistance values of resistance elements provided at opposite sides. Thus, a voltage change "V" will be detected. On the other hand, there is produced no bridge voltage in the bridge circuits shown in FIGS. 9(b) to (f). For instance, in the circuit of FIG. 9(b), if R1 indicates "−", then R2 indicates "+", so that resistance changes are cancelled every branch. As just described above, the action of the force FX is exerted on only VFX, thus making it possible to independently detect the force FX by measurement of VFX.

The fact that only the diagonal components indicate "V" and components except for the above indicate "0" means that respective values detected can be directly obtained as values read from the voltage meters without performing any computation.

It is to be noted that by constructing bridges as described above, it is possible to cancel the influence of resistance change based on factors except for stress. For example, because electric resistances of respective resistance elements vary in dependence upon temperature, but all resistance elements constituting the bridges vary substantially equally, the influence of such temperature changes is cancelled. Accordingly, such a bridge construction can conduct high accuracy measurement.

2.3 Other Embodiments

This invention has been described on the basis of the embodiment illustrated, but this invention is not limited only to such an embodiment. The basic concept of this invention is that resistance elements are arranged in an array as shown in FIG. 7 on the two-dimensional plane, thus to detect three force components and three moment components on the basis of resistance changes due to stress-strains of respective resistance elements. The bridging portions formed in the strain generative body 210 may take any form such that strain is produced by force or moment applied to the working point P. As shown in FIG. 18, slits 217 may be provided in respective portions to form bridging portions 212 to 215.

Further, for resistance element, elements formed by diffusing impurity on the silicon single crystal substrate were used in the above-described embodiment. In addition, strain gauges generally used may stack onto one planar surface. From a viewpoint of forming resistance elements on such a planar surface, it is preferable to use semiconductor resistance elements which can be easily manufactured by the semiconductor planar process as in the above-mentioned embodiment.

Figure 19:
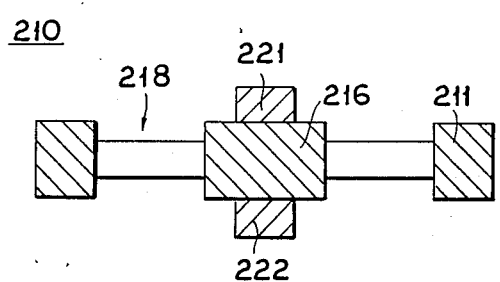
FIG. 19 is a cross sectional view cut along the cutting lines B—B of the device shown in FIG. 7.
Figure 20:
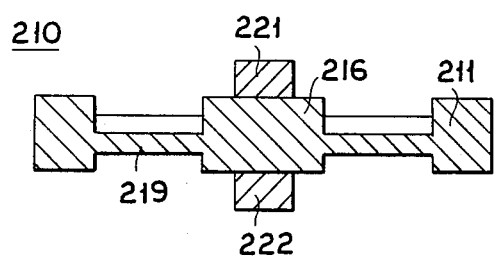
FIG. 20 is a cross sectional view of a detector according to a further embodiment of this invention.

In the above-described embodiment shown in FIG. 7, the cross sectional view cut along the cutting lines B—B is as shown in FIG. 19. Namely, a penetration hole 218 in the form of a quadrant when viewed from the upper direction is formed between two adjacent bridging portions. In addition, by providing thin portion 219 as shown in FIG. 20 between bridging portions without provision of such a penetration hole 218, the advantage with this invention may be obtained.

Figure 21:
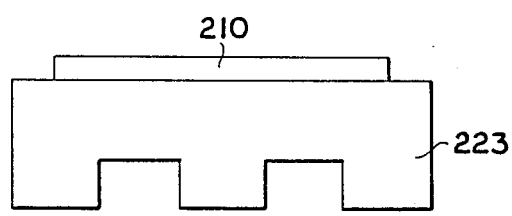
FIG. 21 is a side view of a detector according to a still further embodiment of this invention.

Moreover, since the semiconductor substrate has brittle property in general, for actual realization of products, it is desirable to adhere a supporting substrate 223 having rigidity to the strain generative body 210 as shown in FIG. 21.

In the above-described embodiment, there were used resistance elements R1 to R16 which have all the same resistance value in a steady state and produce the same resistance change with respect to the same stress-strain, but it is not necessarily required to use such identical resistance elements. In this case, components except for diagonal components do not necessarily become equal to "0" in the Table as shown in FIG. 17, resulting in requirement of a predetermined matrix operation. Accordingly, it is preferable for further simplifying an operation for detection to use the same resistance elements as in the above-described embodiment. In the above-described embodiment, 16 sets of resistance element groups R1 to R16 were formed for detecting three force components and three moment components. However, it is not required to detect all of six components. Where it is sufficient that five components or less can be detected, it is not necessary to form all of 16 sets of resistance element groups, but it is enough to form only resistance element groups at principal positions.

2.4 Advantages with this detector

As described above, this detector is constructed to form a plurality of resistance elements at predetermined positions on a planar surface, thus to detect forces in three directions and moments in three directions exerted on the working point on the basis of resistance changes of these resistance elements. Thus, the detector becomes simplified in structure and computation required for detection becomes simple.

§3 Method of manufacturing semiconductor substrate used in this invention

Figure 22A:
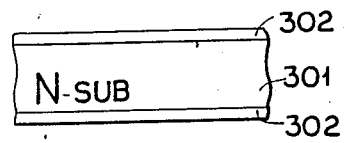
FIG. 22 is a sequential diagram of a process for forming resistance elements used in this invention on a semiconductor substrate.
Figure 22B:
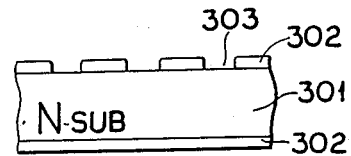
Figure 22C:
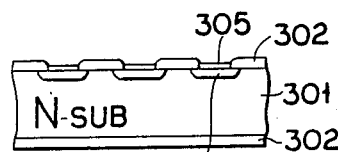
Figure 22D:
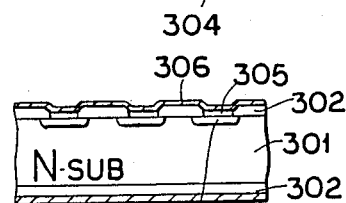
Figure 22E:
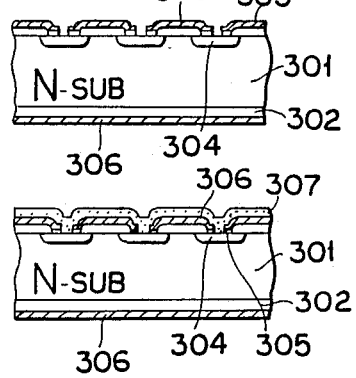
Figure 22F:
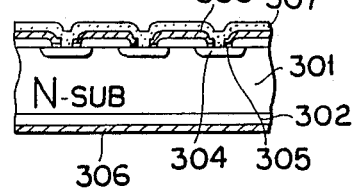
Figure 22G:
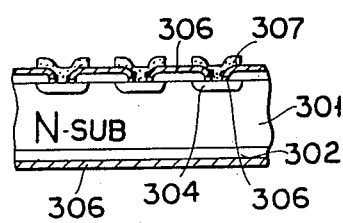

Finally, an example of a method of forming resistance elements used in the detector according to the detector according to this invention is shown. On the semiconductor substrate, a plurality of resistance elements are formed. These resistance elements have piezo resistance effect and are formed on the semiconductor substrate by the semiconductor planar process. First, as shown in FIG. 22(a), an N-type silicon substrate 301 is subjected to thermal oxidation to form a silicon oxide layer 302 on the surface thereof. Then, as shown in FIG. 22(b), the silicon oxide layer 302 is subjected to etching by photolithographic method to form openings 303. Subsequently, as shown in FIG. 22(c), boron is thermally diffused from these openings 303 to form P-type diffused regions 304. It is to be noted that silicon oxide layers 305 are formed in these openings 303. Then, as shown in FIG. 22(d), silicon nitride is deposited by CVD method to form a silicon nitride layer 306 as a protective layer. Further, as shown in FIG. 22(e), contact holes are opened in the silicon nitride layer 306 and the silicon oxide layer 305 by photolithographic method, thereafter to form an aluminum wiring layer 307 by vacuum deposition as shown in FIG. 22(f). Finally, patterning is implemented to the aluminum wiring layer 307 by photo-lithographic method, thus to provide a structure as shown in FIG. 22(g).

It is to be noted that the above-described manufacturing process is illustrated as only one example, and therefore this invention may be realized in principle even with any resistance element such that electric resistance varies due to mechanical deformation.

UTILIZABILITY IN INDUSTRY

The force detector and the moment detector according to this invention can be utilized in a form such that they are embarked or loaded on every industrial machine. Since they are small-sized and low in cost, and permit high accuracy measurement, especially application to automotive vehicles or industrial robots will be expected.

I claim:

1. A detector for detecting forces exerted in respective axial directions and moments exerted around respective axes with an origin (P) being as a working point in an XYZ three-dimensional coordinate system, wherein there are provided
    first bridging portions (214, 215) formed along the X-axis on respective both sides of said origin, and
    second bridging portions (212, 213) formed along the Y-axis on respective both sides of said origin,
    both the ends of said first and second bridging portions being fixed as fixed portions so that strains are produced in said respective bridging portions by applying a force to said origin, respectively, and
    wherein resistance element groups (R) comprising a plurality of resistance elements having a property such that electric resistance changes due to mechanical deformation are provided on the XY plane of said first and second bridging portions at principal positions of the following positions:
    a pair of positions for resistance elements (R13, R15) arranged on both sides of the X-axis in respective positive and negative directions of the Y-axis in the vicinity of said origin in the positive direction of said X-axis,
    a pair of positions for resistance elements (R10, R12) arranged on both sides of said X-axis in respective positive and negative directions of said Y-axis in the vicinity of said origin in the negative direction of said X-axis,
    a pair of positions for resistance elements (R14, R16) arranged on both sides of said X-axis in respective positive and negative directions of said Y-axis in the vicinity of said fixed portion in the positive direction of said X-axis,
    a pair of positions for resistance elements (R9, R11) arranged on both sides of said X-axis in respective positive and negative directions of said Y-axis in the vicinity of said fixed portion in the negative direction of said X-axis,
    a pair of positions for resistance elements (R5, R7) arranged on both sides of said Y-axis in respective positive and negative directions of said X-axis in the vicinity of said origin in the positive direction of said Y-axis,
    a pair of positions for resistance elements (R2, R4) arranged on both sides of said Y-axis in respective positive and negative directions of said X-axis in the vicinity of said origin in the negative direction of said Y-axis,
    a pair of positions for resistance elements (R6, R8) arranged on both sides of said Y-axis in respective positive and negative directions of said X-axis in the vicinity of said fixed portion in the positive direction of said Y-axis, and
    a pair of positions for resistance elements (R1, R3) arranged on both sides of said Y-axis in respective positive and negative directions of said X-axis in the vicinity of said fixed portion in the negative direction of said Y-axis,
    thus to detect a change in the force exerted on said origin on the basis of changes in electric resistances of respective resistance elements.

2. A detector as set forth in claim 1, wherein a bridge assembly is constructed by resistance elements to make a detection:
    said bridge assembly comprising:
    (1) a bridge provided at one opposite sides with two resistor pairs, one resistor pair being obtained by connecting in series two resistance elements (R15, R16) positioned in the positive direction of said X-axis and on the positive side of said Y-axis with respect to said X-axis, and the other resistor pair being obtained by connecting in series two resistance elements (R13, R14) positioned in the positive direction of said X-axis and on the negative side of said Y-axis with respect to said X-axis, respectively,
    said bridge further provided at the other opposite sides with two resistor pairs, one resistor pair being obtained by connecting two resistance elements (R11, R12) positioned in the negative direction of said X-axis and on the positive side of said Y-axis with respect to said X-axis, and the other resistor pair being obtained by connecting in series two resistance elements (R9, R10) positioned in the negative direction of said X-axis and on the negative side of said Y-axis with respect to said X-axis, respectively, thus to detect a force in the X-axis direction on the basis of a bridge voltage of said bridge,
    (2) a bridge provided at one opposite sides with two resistor pairs, one resistor pair being obtained by connecting in series two resistance elements (R5, R6) positioned in the positive direction of said Y-axis and on the positive side of said X-axis with respect to said Y-axis, and the other resistor pair being obtained by connecting in series two resistance elements (R7, R8) positioned in the positive direction of said Y-axis and on the negative side of said X-axis with respect to said Y-axis, respectively,
    said bridge further provided at the other opposite sides with two resistor pairs, one resistor pair being obtained by connecting in series two resistance elements (R1, R2) positioned in the negative direction of said Y-axis and on the positive side of said X-axis with respect to said Y-axis, and the other resistor pair being obtained by connecting in series two resistance elements (R3, R4) positioned in the negative direction of said Y-axis and on the negative side of said X-axis with respect to said Y-axis, respectively, thus to detect a force in the Y-axis direction on the basis of a bridge voltage of said bridge, (3) a bridge provided at one opposite sides with two resistor pairs, one resistor pair being obtained by connecting in series a resistance element (R16) positioned in the vicinity of said fixed portion in the positive direction of said X-axis and on the positive side of said Y-axis with respect to said X-axis and a resistance element (R9) positioned in the vicinity of said fixed portion in the negative direction of said X-axis and on the negative side of said Y-axis with respect to said X-axis, and the other resistor pair being obtained by connecting in series a resistance element (R14) positioned in the vicinity of said fixed portion in the positive direction of said X-axis and on the negative side of said Y-axis with respect to said X-axis and a resistance element (R11) positioned in the vicinity of said fixed portion in the negative direction of said X-axis and on the positive side of said Y-axis with respect to said X-axis, respectively, said bridge further provided at the other opposite sides with two resistor pairs, one resistor pair being obtained by connecting in series a resistance element (R15) positioned in the vicinity of said origin in the positive direction of said X-axis and on the positive side of said Y-axis with respect to said X-axis and a resistance element (R10) positioned in the vicinity of said origin and on the negative side of said Y-axis with respect to said X-axis, and the other resistor pair being obtained by connecting in series a resistance element (R13) in the vicinity of said origin in the positive direction of said X-axis and a resistance element (R12) in the vicinity of said origin in the negative direction of said X-axis and on the positive side of said Y-axis with respect to said X-axis, respectively, thus to detect a force in the Z-axis direction on the basis of a bridge voltage of said bridge, (4) a bridge provided atone opposite sides with two resistor pairs, one resistor pair being obtained by connecting in series two resistance elements (R6, R8) in the vicinity of said fixed portion in the positive direction of said Y-axis, and the other resistor pair being obtained by connecting in series two resistance elements (R2, R4) in the vicinity of said fixed portion in the negative direction of said Y-axis, respectively, said bridge further provided at the other opposite sides with two resistor pairs, one resistor pair being obtained by connecting in series two resistance elements (R5, R7) positioned in the vicinity of said origin in the positive direction of said Y-axis, and the other resistor pair being obtained by connecting in series two resistance elements (R1, R3) positioned in the vicinity of said fixed portion in the negative direction of said Y-axis, respectively, thus to detect a moment around said X-axis on the basis of a bridge voltage of said bridge, (5) a bridge provided at one opposite sides with two resistor pairs, one resistor pair being obtained by connecting in series two resistance elements (R14, R16) positioned in the vicinity of said fixed portion in the positive direction of said X-axis, and the other resistor pair being obtained by connecting two resistance elements (R10, R12) positioned in the vicinity of said origin in the negative direction of said X-axis, respectively, said bridge further provided at the other opposite sides with two resistor pairs, one resistor pair being obtained by connecting in series two resistance elements (R13, R15) positioned in the vicinity of said origin in the positive direction of said X-axis, and the other resistor pair being obtained by connecting in series two resistance elements (R9, R11) positioned in the vicinity of said fixed portion in the negative direction of said X-axis, respectively, thus to detect a moment around said Y-axis on the basis of a bridge voltage of said bridge, and (6) a bridge provided at one opposite sides with two resistor pairs, one resistor pair being obtained by connecting in series a resistance element (R15, R16) positioned in the vicinity of said origin or said fixed portion in the positive direction of said X-axis and on the positive side of said Y-axis with respect to said X-axis and a resistance element (R9, R10) positioned in the vicinity of said origin or said fixed portion in the negative direction of said X-axis and on the negative side of said Y-axis with respect to said X-axis, and the other resistor pair being obtained by a resistance element (R7, R8) positioned in the vicinity of said origin or said fixed portion in the positive direction of said Y-axis and on the negative side of said Y-axis with respect to said Y-axis and a resistance element (R1, R2) positioned in the vicinity of said origin or said fixed portion in the negative direction of said Y-axis and on the positive side of said X-axis with respect to said Y-axis, respectively, said bridge further provided at the other opposite sides with two resistor pairs, one resistor pair being obtained by connecting in series a resistance element (R11, R12) positioned in the vicinity of said origin or said fixed portion in the negative direction of said X-axis and on the positive side of said Y-axis with respect to said X-axis and a resistance element (R13, R14) positioned in the vicinity of said origin or said fixed portion in the positive direction of said X-axis and on the negative side of said Y-axis with respect to said X-axis, and the other resistor pair being obtained by a resistance element (R3, R4) positioned in the vicinity of said origin or said fixed portion in the negative direction of said Y-axis and on the negative side of said X-axis with respect to said Y-axis and a resistance element (R5, R6) positioned in the vicinity of said origin or said fixed portion in the positive direction of said Y-axis and on the positive side of said X-axis with respect to said Y-axis, respectively, thus to detect a moment around said Z-axis on the basis of a bridge voltage of said bridge.

3. A detector as set forth in claim 1, wherein, under condition where no force or moment is exerted, respective resistance elements all have substantially the same resistance value, and changes in electric resistance based on strains produced in said bridging portions are substantially equal to each other for respective resistance elements.

4. A detector as set forth in claim 1, which further comprises a supporting substrate (223) adjoining each bridging portion.

* * * * *